United States Patent

Blanchard et al.

[11] Patent Number: 5,569,444
[45] Date of Patent: Oct. 29, 1996

[54] PROCESS OF OBTAINING A METAL HYDROXIDE POWDER AND POWDER OBTAINED BY THE PROCESS

[76] Inventors: Philippe Blanchard, 26, Chemin Lafon, 33160 St. Medard en Jalles; Jean-Paul Klein, c/o Institute de Techniques Chimiques 6, rue Jean Massé, 69190 Saint Fons, both of France

[21] Appl. No.: 330,034

[22] Filed: Oct. 27, 1994

Related U.S. Application Data

[63] Continuation of Ser. No. 6,198, Jan. 19, 1993, abandoned, which is a continuation of Ser. No. 772,420, Oct. 19, 1991, abandoned, which is a continuation-in-part of Ser. No. 612,158, Nov. 9, 1990, abandoned.

[30] Foreign Application Priority Data

Jun. 18, 1990 [FR] France ................... 90 07583

[51] Int. Cl.$^6$ ............... C01G 51/00; C01G 53/00; C01G 9/00; C01G 11/00
[52] U.S. Cl. ............... 423/594; 429/222; 429/223
[58] Field of Search ............... 423/593, 594, 423/622; 429/222, 223, 229

[56] References Cited

U.S. PATENT DOCUMENTS 3,951,686  4/1976  Ness et al. ................... 429/223
3,988,263  10/1976  Hansford ................... 502/342
4,844,999  7/1989  Oshitani et al. ................... 429/223

FOREIGN PATENT DOCUMENTS 59-143272  8/1984  Japan ................... 429/223
2-6340  1/1990  Japan.

OTHER PUBLICATIONS

Perry's Chemical Engineers' Handbook, 5th edition, pp. 19–3 to 19–10, 1973.

Primary Examiner—Steven Bos

[57] ABSTRACT

A process of preparing a powder of metal hydroxides based on nickel hydroxide for an electrode of an electrochemical cell having an alkaline electrolyte. The process includes introducing a solution of salts of nickel and of cobalt and of cadmium and/or zinc into a reactor in a slow and continuous manner under good stirring conditions, together with a strong base and an ammonium salt. Proportions of the ingredients are determined so that the pH of the mixture is stabilized at a value of 9.2±0.1, and the temperature is maintained between 80° C. and 85° C. Particles metal hydroxide precipitated from the reaction are filtered, washed, and dried.

6 Claims, 1 Drawing Sheet

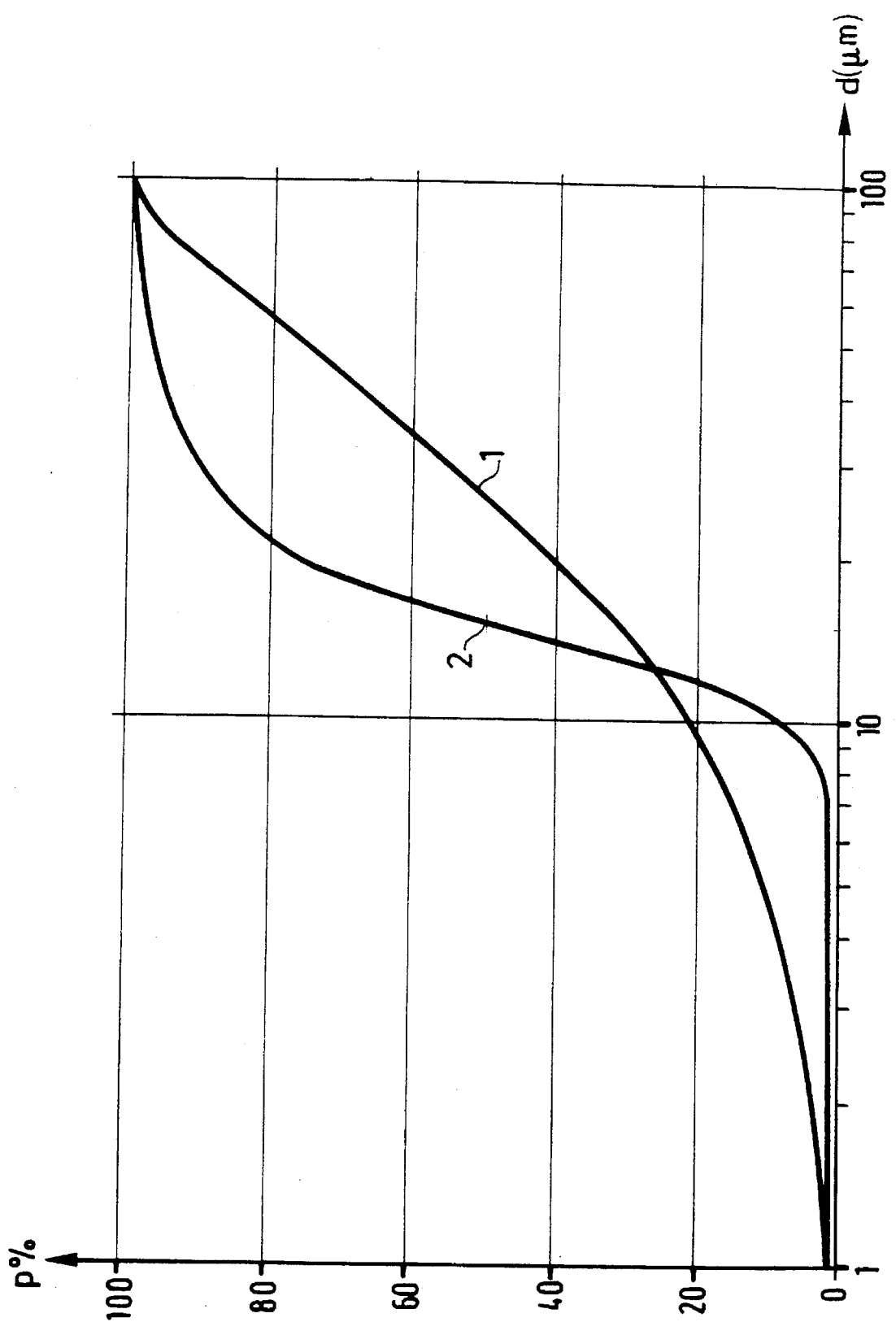

PROCESS OF OBTAINING A METAL HYDROXIDE POWDER AND POWDER OBTAINED BY THE PROCESS

This is a continuation of application Ser. No. 08/006,198 filed 19 Jan. 1993, now abandoned, which was a continuation of Ser. No. 07/772,420 filed 7 Oct. 1991, now abandoned, which was a continuation-in-part of Ser. No. 07/612,158 filed 9 Nov. 1990, now abandoned.

BACKGROUND OF THE INVENTION

1. Field of the Invention

This invention relates to a process of preparing a powder of metal hydroxides, wherein the powder is intended for use in alkaline storage batteries.

2. Background Art

In general, when using powders in industrial processes, it is desirable that these powders be composed of particles having a high apparent density, a centered granulometry and good flowability, wherein the latter may be quantified by measuring the angle of repose. The apparent density is defined in *Metals Handbook,* Vol. 7, p. 274 (1984), The American Society for Metals. The measurement of the angle of repose is described in Metals Handbook, Vol. 7, p. 282 (1984). When these three characteristics can be obtained, they minimize resulting problems of heterogeneity and reproducibility when filling a specific capacity, and they also minimize the formation of dust particles.

When the application involves powders of hydroxides or metal salts, the most widespread manufacturing process employed to produce these characteristics is granulation, atomization being a typical example. This process, which in other respects is highly efficient, requires the use of organic adjuvants with a high carbon content to bond the fine particles to each other. Unfortunately, the presence of these adjuvants results in powders which are unsuitable for use in alkaline storage batteries, because the decomposition of the carbon chains produces carbonates, resulting in a deterioration of the electrical performance of the batteries.

To prepare the nickel hydroxide which is employed in these batteries, the usual process is to briefly bring into contact a solution of a nickel salt and a base, for example, soda (sodium hydroxide). The product obtained is in the form of very fine particles which are produced as the result of an extremely intensive nucleation process generated by strong supersaturation. The nickel hydroxide is difficult to separate from the reaction medium, and due to the fine size of the particles, it is necessary to perform long filtration processes before it can be dried and then ground to produce a powder. Moreover, this powder does not display the three characteristics described above: a high apparent density, controlled granulometry, and flowability.

Also known, from Japanese patent publication JP-A 63 91120, is a process for preparing a nickel hydroxide powder comprising the steps of introducing into a reactor a nickel salt, a strong base, and an ammonium salt, the temperature of the reaction being maintained between 20° C. and 80° C. and the pH value within the reaction being held between 9 and 12.

The present applicants have discovered that, if the process is performed as described in this document, the nickel hydroxide is produced:

(a) either in the form of irregularly shaped particles that must be subsequently ground, resulting in a powder of which the density of the grains is too small;

(b) or in the form of nearly spherical particles of 15 to 20 μm, but having a high internal porosity, resulting again in a grain density that is too small.

Furthermore, the described hydroxide cannot be used as such in an electric cell, for it does not contain a specified number of additives needed for good functioning.

SUMMARY OF THE INVENTION

The object of this invention is to provide a manufacturing process for producing an hydroxide powder having an improved apparent density, having controlled flowability and granulometry, and which may be used directly as the active material in an alkaline storage battery without requiring a grinding operation.

The object of this invention is achieved by a process of preparing a powder of metal hydroxides based on nickel hydroxide for use as an electrode of an electrochemical cell with alkaline electrolyte, this process being characterized by the steps of:

simultaneously and in a continuous manner introducing into a reactor:

(a) a solution of nitrates or sulfates of nickel, of cobalt, and of cadmium and/or zinc, the proportion of cobalt being between 1% and 8%, and the proportion of cadmium and/or zinc being on the order of 3% to 10%, by weight of the total metals present in the solution, (b) an ammonium salt in an amount such that the ratio of ammonium ions to nickel ions of solution (a) is between about 0.3 and about 0.6, and (c) a strong base in an amount such that the pH of the reaction medium is stabilized at a value of 9.2±0.1;

maintaining the temperature of the reactor at a value greater than about 80° C.;

stirring the mixture in the reactor with a propeller turning at 300 to 1,000 revolutions per minute; and filtering, washing, and drying the particles of precipitate thus obtained.

The temperature of the reactor is stabilized at a value in the neighborhood of 80° C. to 85° C.

According to a first embodiment of the method, the proportion of cobalt is on the order of 2% and that of cadmium is 10% by weight relative to the total amount of metals contained in solution (a); the ammonium salt is then introduced so as to maintain the ratio of ammonium ions to nickel ions at about 0.6.

It was found that when an ammonium salt is introduced into the reactor according to the preceding conditions, the formation of compounds which are soluble with the metal ions causes reduction of the supersaturation in the vicinity of the particles. Furthermore, from an industrial standpoint, this addition provides for self-regulation of the pH by the creation of a buffer effect between the species $NH_4^+$ and $NH_3$.

The process according to the invention acts on the physical characteristics of the particles at the time they are formed, that is, during the precipitation process.

By performing all of the conditions specified above, it is possible to obtain particles which are easy to filter, with a high apparent density, with a centered granulometry and displaying good flowability properties by virtue of a controlled crystalline growth. These powders have optimal characteristics for use directly as active material for an electrode of an electrochemical cell having an alkaline electrolyte.

Other characteristics and advantages of this invention shall be made apparent in the description which follows of a non-limiting embodiment which is provided for purposes of illustration.

BRIEF DESCRIPTION OF THE DRAWING

The single FIGURE appended illustrates the particle size distribution of a nickel hydroxide powder obtained by a prior art process and of a nickel hydroxide powder obtained using the process according to the invention. The cumulative weights p (in %) of the powder are shown along the ordinates and the corresponding diameters of the powder grains (in microns) are shown along the abscissa.

DETAILED DESCRIPTION OF THE PREFERRED EMBODIMENTS

The prior art process consists of rapidly pouring an aqueous solution of nickel sulfate having a concentration of 1M and at a temperature of 95° C. into an aqueous solution of soda (sodium hydroxide) with a concentration of 3M, heated to 90° C. The fine particles resulting from the precipitation are filtered, dried, washed, and then ground.

The physical characteristics of this powder are the following:

non tap apparent density measured using a Hall and Carney apparatus: 0.9 g/cm$^3$;

particle size distribution as shown on curve 1 of the appended drawing;

angle of repose measured by the technique known as the fixed-base cone method: 60 degrees; this high value indicates an irregular morphology of the particles.

According to a first example of performing the process according to the invention, the following are introduced in a reactor with a capacity of one liter:

(a) an aqueous solution of nitrates of nickel, cobalt and cadmium with the following concentrations (by weight of metal:

$$\frac{Co}{\Sigma(Ni + Co + Cd)} = 2\% \text{ and}$$

$$\frac{Cd}{\Sigma(Ni + Co + Cd)} = 10\%,$$

the solution being introduced at a rate of 0.8 ml per minute;

(b) an aqueous solution of NH$_4$NO$_3$ at about 50 g/liter concentration at a rate of 0.8 ml/minute; and (c) a solution of sodium hydroxide of about 2M concentration at a rate of about 1.6 ml/minute.

The temperature is maintained at 85° C. and the medium is stirred using a propeller having three blades and a diameter of about half the diameter of the reactor and rotating at a speed of 600 revolutions per minute.

After filtration, washing and drying, a powder composed of a ternary hydroxide of nickel, cobalt and cadmium is obtained, displaying the following characteristics:

non tap apparent density measured using the Hall and Carney apparatus: greater than 1.5 g/cm$^3$ μm, centered granulometry, around a value of 20 μm, as shown by curve 2 of the appended drawing;

angle of repose measured using the technique known as the fixed-base cone method: 27 degrees; this low value of the angle of repose reflects the round shape of the particles.

specific surface area of about 12 m$^2$/g.

This powder may be used directly as the positive active material in the electrodes of alkaline storage batteries.

According to a second example of the process, the cadmium nitrate of the first example is totally replaced by zinc nitrate, all of the other conditions of example 1 being unchanged.

According to a third example, the cadmium nitrate is partially replaced by zinc nitrate, the total proportion by weight of cadmium and zinc in the third example being equivalent to the proportion of cadmium in the first example.

In a fourth example of the process according to the invention, the proportion of cobalt is no longer 2% but is 8%. All the other operational conditions are the same as in the first example, except for the concentration of ammonium nitrate, which is increased to 100 g/l.

The powder obtained from the process of example 4 has the same characteristics as the powder of example 1.

I claim:

1. A process of preparing a metal hydroxide powder including primarily nickel hydroxide, for an electrode of an electrochemical cell having an alkaline electrolyte, the process comprising:

introducing into a reactor, simultaneously and continuously;

(a) a solution of nitrates or sulfates of nickel, of cobalt, and of cadmium and/or of zinc, the proportion of cobalt being between 1% and 8%, and the proportion of cadmium and/or zinc being about 3% to about 10%, by weight of the total metals present in the solution, (b) ammonium nitrate or an equivalent source of ammonium ions in an amount such that the ratio of ammonium ions to nickel ions of solution (a) is between about 0.3 and about 0.6, and (c) sodium hydroxide or an equivalent strong base in an amount such that the pH of the reaction medium is stabilized at a value of 9.2±0.1, the solution of nitrates or sulfates, the source of ammonium ions, and the strong base forming a mixture in the reactor; maintaining the temperature of the reactor at a value greater than about 80° C.;

stirring the mixture in the reactor to form particles of precipitate; and filtering, washing, and drying the particles of precipitate obtained from the stirred mixture to obtain the metal hydroxide powder suitable for use directly as an active material in an alkaline storage cell.

2. A process according to claim 1 wherein the proportion of cobalt is about 2% and the proportion of cadmium is about 10%, by weight of the total metals contained in solution (a), and wherein the amount of said ammonium ion source introduced is such that the ratio of ammonium ions to nickel ions is about 0.3.

3. A process according to claim 1, wherein the proportion of cobalt is about 6% to about 8% and the proportion of cadmium is about 10%, by weight of the total metals contained in solution (a), and wherein the amount of said ammonium ion source introduced is such that the ratio of ammonium ions to nickel ions is about 0.6.

4. A process according to claim 1, wherein the reactor temperature is maintained at a level ranging from 80° to 85° C.

5. A process according to claim 2, wherein the reactor temperature is maintained at a level ranging from 80° to 85° C.

6. A process according to claim 3, wherein the reactor temperature is maintained at a level ranging from 80° to 85° C.

* * * * *